Aug. 26, 1930.        D. B. GOOD        1,774,199
TONNEAU CONSTRUCTION
Filed Oct. 31, 1929
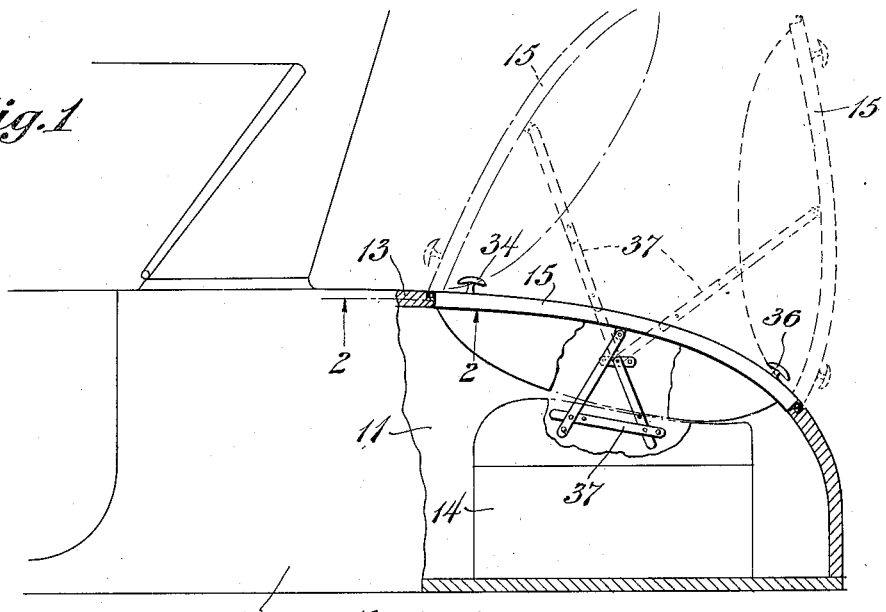
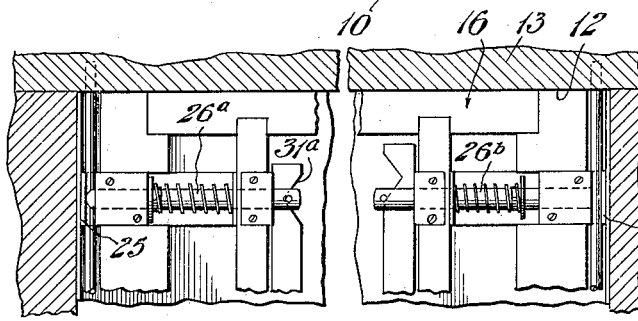
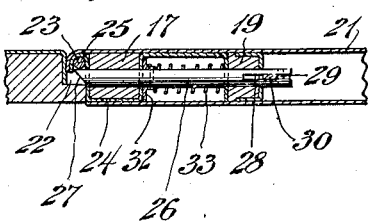
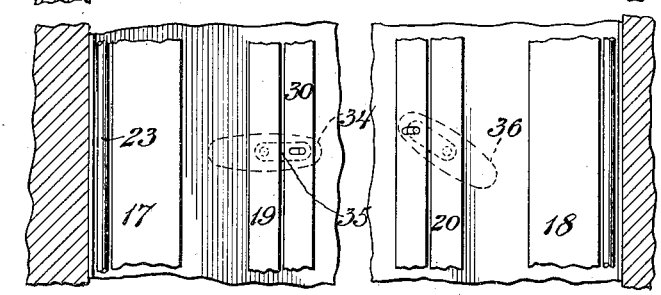
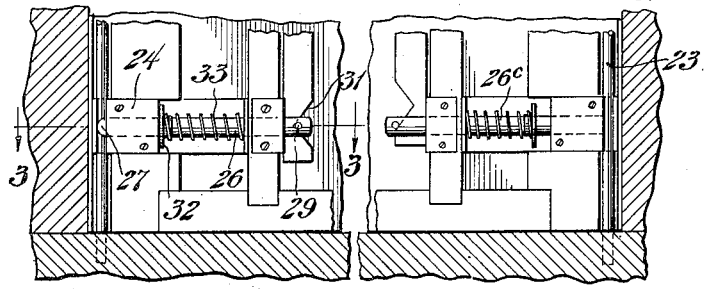
INVENTOR
David B. Good
BY
ATTORNEYS Patented Aug. 26, 1930

1,774,199

UNITED STATES PATENT OFFICE

DAVID B. GOOD, OF MOUNT JACKSON, VIRGINIA, ASSIGNOR OF ONE-HALF TO H. H. MARTZ, OF MOUNT JACKSON, VIRGINIA

TONNEAU CONSTRUCTION

Application filed October 31, 1929. Serial No. 403,756.

This invention relates to tonneau constructions and, among other objects, aims to provide an improved tonneau cover for rumble seat compartments, so constructed as to permit the cover to be swung upwardly either toward the front or the rear of the tonneau.

In the drawings,

Fig. 1 is an elevation of the rear portion of an automobile with the rumble seat compartment in section and showing one embodiment of the invention;

Fig. 2 is a sectional view taken on the line 2—2 of Fig. 1 and drawn on a larger scale; and Fig. 3 is a sectional view taken on the line 3—3 of Fig. 2.

In automobiles having rumble seat compartments, it is frequently desirable to utilize the compartment as a storage space for baggage, etc., especially when on a tour and with only the front seat occupied by passengers. The rumble seat is generally removably secured in the compartment so that when it is removed a large storage space is provided. However, heretofore the compartment cover has always been arranged so as to swing upwardly toward the rear, making it very inconvenient to place baggage in the compartment. The present invention provides a novel combination latch and hinge means at both the front and rear edges of the cover so that it may be swung upwardly either toward the front or rear.

Referring particularly to the drawing, the preferred form of the invention is there shown embodied in an automobile tonneau 10 having a rumble seat compartment 11 to which access is had through an opening 12 in the rear deck 13. When the rumble seat 14 is not in use, the opening is generally closed by the cover 15 which carries the rumble seat back.

Referring to Fig. 2, the cover 15 is there shown as comprising a rectangular frame 16 having front and rear cross bars 17 and 18 and intermediate bars 19 and 20 respectively. The frame has an outer covering of sheet metal 21 while the seat back is secured to the inner side.

The upper edges of the deck adjacent to the front and rear edges of the cover are rabbeted as at 22 and extending between the sides of the opening 12 and in each rabbet but spaced from the walls thereof is a pivot rod 23. Near each end of each of the bars 17 and 18 is a combined hinge and latch member adapted to co-operate with the adjacent rod 23. As all of the members are similar, only one will be described, namely, the one shown in Fig. 3 and in the lower left hand corner of Fig. 2. The hinge member is there shown as including a sheet metal plate 24 extending around the rear, lower and front faces of the bar 17 and having a hooked outer upper end 25 adapted partially to surround the rod 23. The other end of the plate is extended from the bar 17 to the bar 19 adjacent to the covering 21 and down the front face of the bar 19.

A latch plunger 26 is slidably mounted in suitable openings provided in the bars 17 and 19 and in the plate 24. The front end of the plunger extends beneath the rod 23 and has a lower inclined face 27 while the rear end extends beyond the rear face of the bar 19. This end of the plunger is provided with a horizontal slot 28 and also has a pin 29 passing therethrough near the end and at right angles to the slot. An operating bar 30 extends through the slot and has a V-shaped notch 31 providing cam surfaces adapted to co-operate with the pin 29 as will be described.

Surrounding the plunger between the bar 19 and a flanged collar 32 secured to the plunger is an expansile coiled spring 33 adapted to hold the plunger in locked position as shown in Fig. 3. The operating bar 31 is adapted to operate both of the latches at one end of the cover and therefore has another notch 31$^a$ to actuate the other associated plunger 26$^a$ at the front of the cover. When the plungers are in locked position, as shown at the left of Fig. 2, the pins 29 are at the apices of the notches. When the bar 30 is moved longitudinally of itself the cam faces of the notches will cause the plungers to be withdrawn. The bar may be moved by a suitable handle 34 having a crank arm 35 connected to the bar 30.

The plungers 26$^b$ and 26$^d$ at the rear end of the cover operate in the same manner as the front plungers by means of a handle 36.

When it is desired to open the cover from the back to remove the seat and place baggage, the handle 36 is turned and the latches 26$^b$ and 26$^c$ are withdrawn, as shown at the right side of Fig. 2. The rear end of the cover is then free to be raised while the front end hinges around the front rod 23. When the cover is closed, the inclined portion on the plungers engage the rod and cause the plungers to move against the action of the springs, thereby permitting the cover to close with the hooks 25 resting on the rods 23. The plungers are then moved outwardly by the springs and the cover is locked closed. If it is desired to open the cover from the front, as when the rumble seat is to be occupied, it is only necessary to turn the handle 34 and lift the cover.

To hold the cover in either of its open positions, a sectional arm 37 is pivotally connected at one end to the cover between its front and rear edges and to the side of the compartment 11. The arm is preferably made in three sections pivotally connected together so as to prevent the arm from locking the cover closed, as might occur if it were in only two sections. Any suitable means may be employed to hold the arms straightened when the cover is open, such as a projection on one section engaging a recess on the next section, as indicated in Fig. 1.

Obviously, the present invention is not restricted to the particular embodiment thereof herein shown and described.

What I claim is:—

1. In combination with the rear deck of an automobile, said deck having an opening therein; a cover for closing said opening; a transverse pivot rod near the front and rear edges of the opening; a pair of hook-shaped hinge elements at each end of the cover adapted to partially surround the upper portion of the rods; locking means on the cover to hold said hinge elements engaged with the rods; and manually operable means associated with each pair of hinge elements to release the locking means to permit the associated hinge elements to be disengaged from the rods.

2. In combination with the deck of a rumble seat compartment and a cover for the compartment; cooperating hinge means on the deck and cover at the front and rear ends of the cover to permit the cover to be opened from either end; and a section arm pivoted to the cover and to the compartment to hold the cover in either of its open positions.

3. In combination with the rear deck of an automobile, said deck having an opening therein; a cover for closing said opening; a transverse pivot rod near the front and rear edges of the opening; a bar at the front and rear edges of the cover; a plate extending around the rear, lower and front faces of each bar and having a hooked outer end adapted partially to surround the adjacent pivot rod; locking means on the cover to hold said hinge elements engaged with the rods; and manually operable means associated with each pair of hinge elements to release the locking means to permit the associated hinge elements to be disengaged from the rods.

4. In combination with an automobile rear deck having a top opening therein; a cover for closing said opening; pivot means secured to the rear deck near the front and rear edges of said opening; hinge elements secured to the cover at its front and rear edges and resting on said pivot means when the cover is closed; means at both edges of the cover to lock the cover when closed, said cover-locking means having parts engaging underneath said pivot means when the cover is closed and cooperating with said hinge elements when the cover is swung to provide bearings for the pivot means; and manually operable means to release said locking means to permit the cover to be opened at either edge and be swung at the opposite edge to a substantially upright position.

In testimony that I claim the foregoing as my own, I have hereto affixed my signature.

DAVID B. GOOD.